(12) United States Patent
Abu-Qahouq

(10) Patent No.: US 9,558,878 B1
(45) Date of Patent: Jan. 31, 2017

(54) MULTI-STAGE PERMANENT MAGNET STRUCTURE AND INTEGRATED POWER INDUCTORS

(71) Applicant: Board of Trustees of The University of Alabama, Tuscaloosa, AL (US)

(72) Inventor: Jaber A. Abu-Qahouq, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 137 days.

(21) Appl. No.: 14/289,161

(22) Filed: May 28, 2014

Related U.S. Application Data

(60) Provisional application No. 61/827,851, filed on May 28, 2013.

(51) Int. Cl.
*H01F 27/24* (2006.01)
*H01F 7/02* (2006.01)
*B82Y 25/00* (2011.01)

(52) U.S. Cl.
CPC ............... *H01F 27/24* (2013.01); *H01F 7/02* (2013.01); *B82Y 25/00* (2013.01); *Y10S 977/932* (2013.01)

(58) Field of Classification Search
CPC ............ H01F 27/24; H01F 7/02; B82Y 25/00; Y10S 977/932
See application file for complete search history.

(56) References Cited

U.S. PATENT DOCUMENTS 4,535,312 A * 8/1985 Lomax ................. H01H 51/29
200/278
5,475,353 A * 12/1995 Roshen ................ H01H 50/005
200/512
2009/0045807 A1* 2/2009 Nishida .................. G01D 5/145
324/207.2
2013/0333820 A1* 12/2013 Sherrer ..................... C25D 5/02
156/60
2014/0152245 A1* 6/2014 Choi ..................... H02J 7/0042
320/108

FOREIGN PATENT DOCUMENTS

JP 2007266245 A * 10/2007
JP 2010056755 A * 3/2010

OTHER PUBLICATIONS

Machine translation of JP 2007266245 A.*

* cited by examiner

*Primary Examiner* — Mohamad Musleh
(74) *Attorney, Agent, or Firm* — Meunier Carlin & Curfman LLC

(57) ABSTRACT

Apparatuses and methods directed to multi-stage permanent magnet and implementations of a permanent magnet on-chip power inductor. Various circuit models, design considerations and simulation results are described. The multi-stage permanent magnet includes layers with uniform or non-uniform magnets used to control the flux distribution. The permanent magnet on-chip power converter for DC-DC switching power converters that may include a top ferrite layer, a spiral winding layer, a permanent magnet layer, a bottom ferrite layer, and a substrate layer. The permanent magnet layer may comprise a multi-stage structure wherein each stage has a decreasing area as compared to an immediate lower stage. A method of manufacturing a Permanent On-Chip Power Inductor (PMOI) is also disclosed.

9 Claims, 15 Drawing Sheets

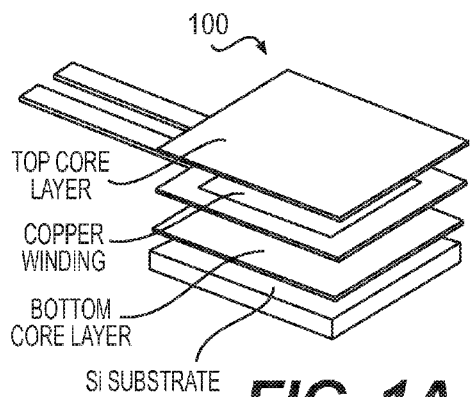
FIG. 1A
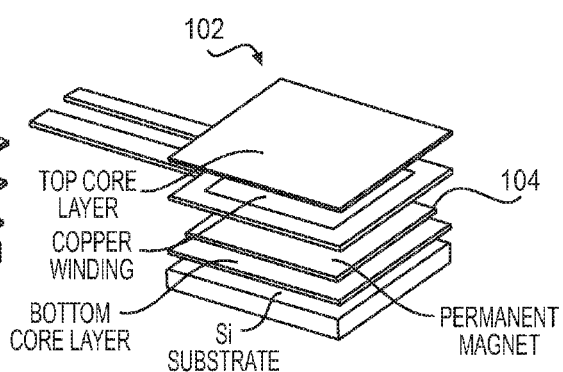
FIG. 1B
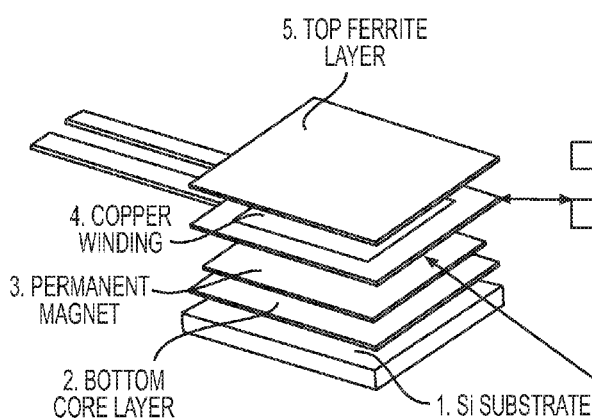
FIG. 4A
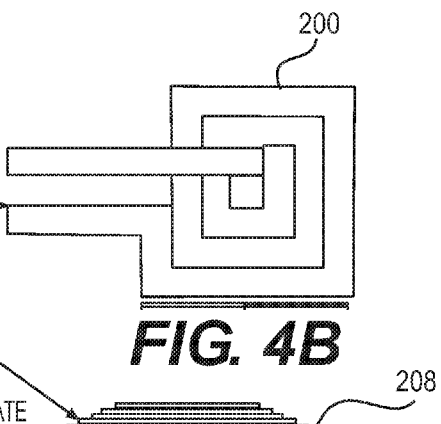
FIG. 4B
FIG. 4C
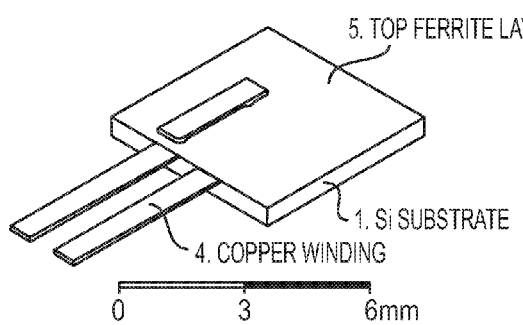
FIG. 5A
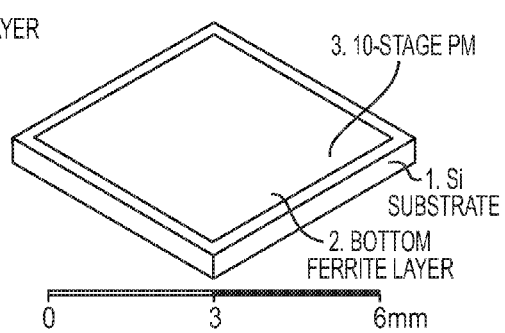
FIG. 5B

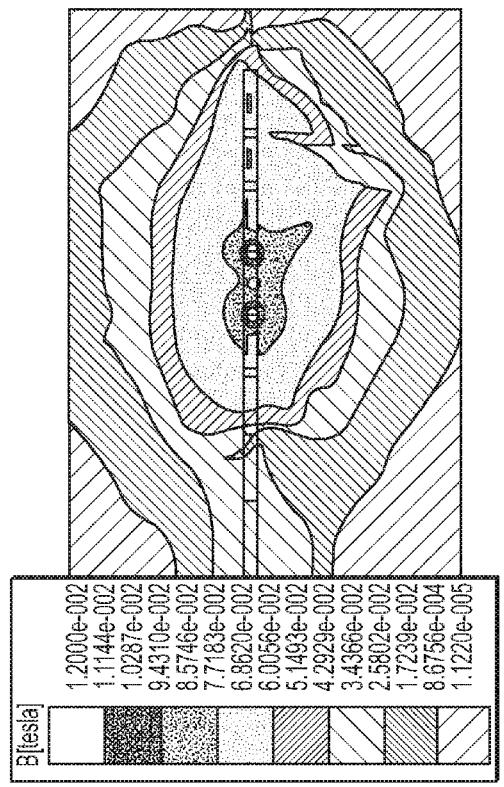
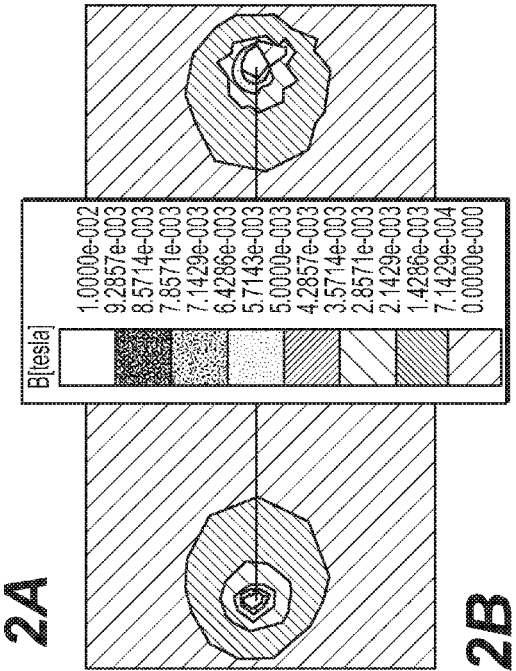
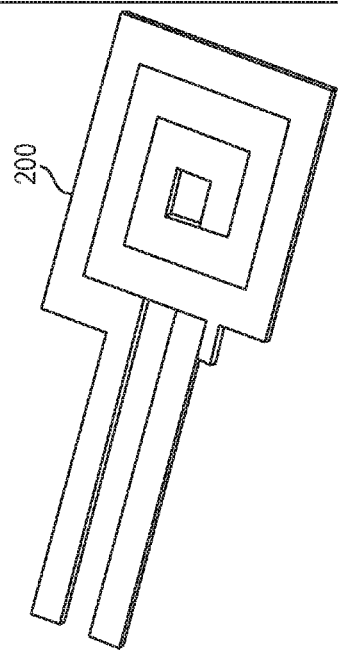
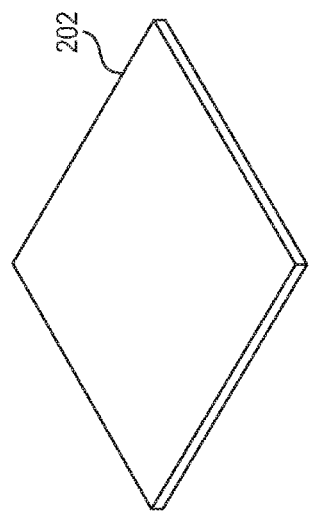
*FIG. 2A*
*FIG. 2B*

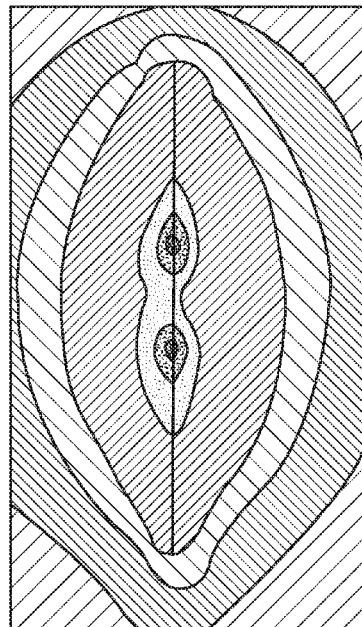
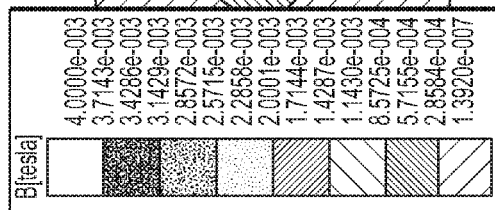
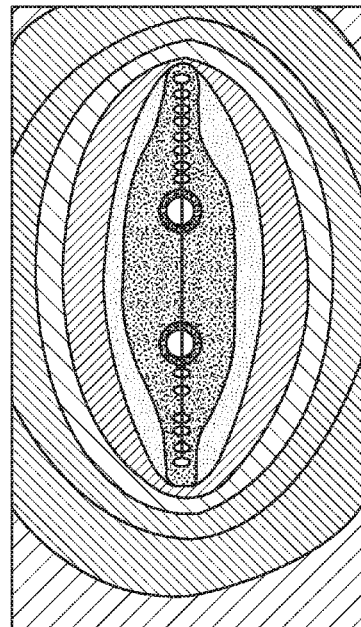
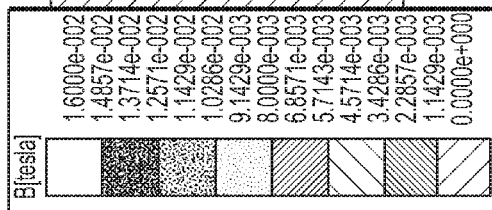
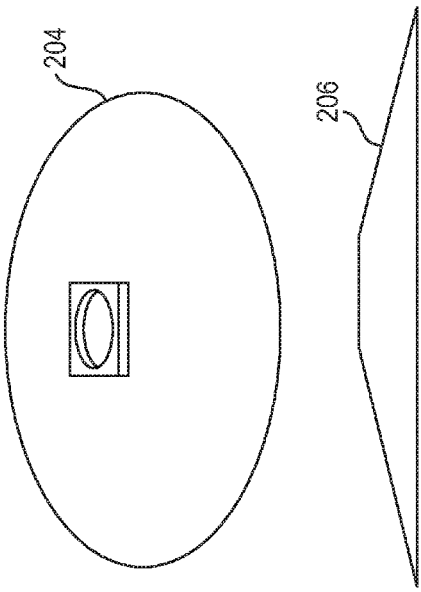
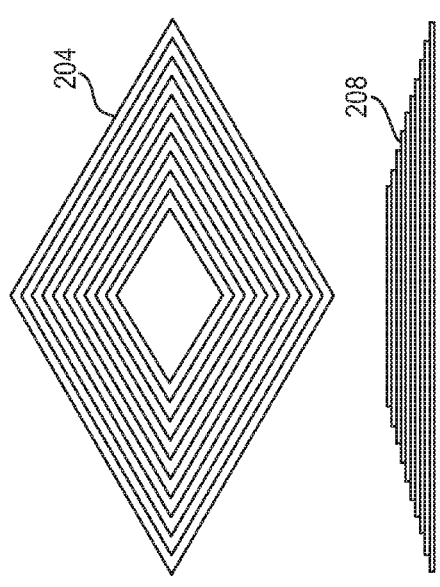
FIG. 2C
FIG. 2D

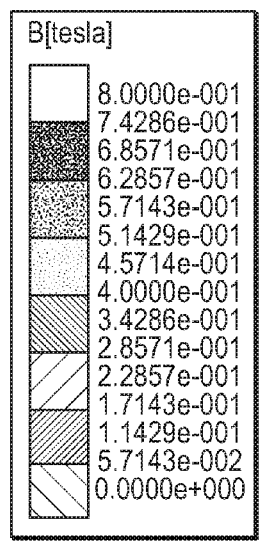
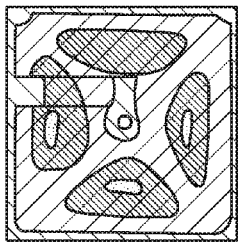 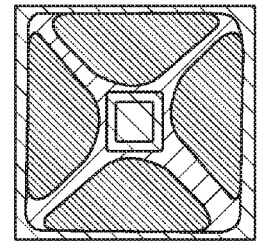 FIG. 7A
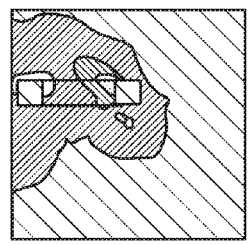 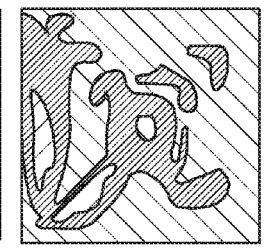 FIG. 7B
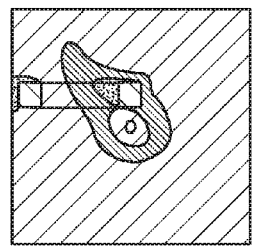 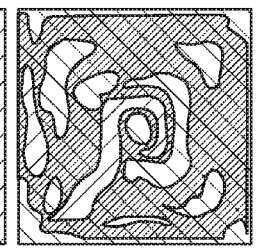 FIG. 7C
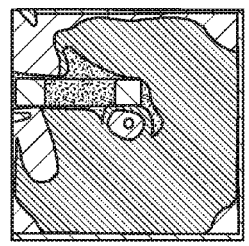 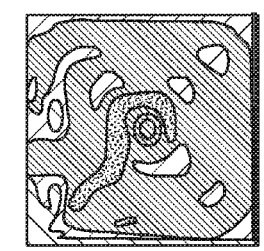 FIG. 7D
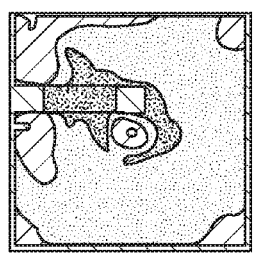 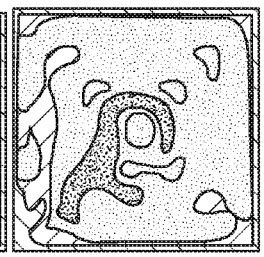 FIG. 7E

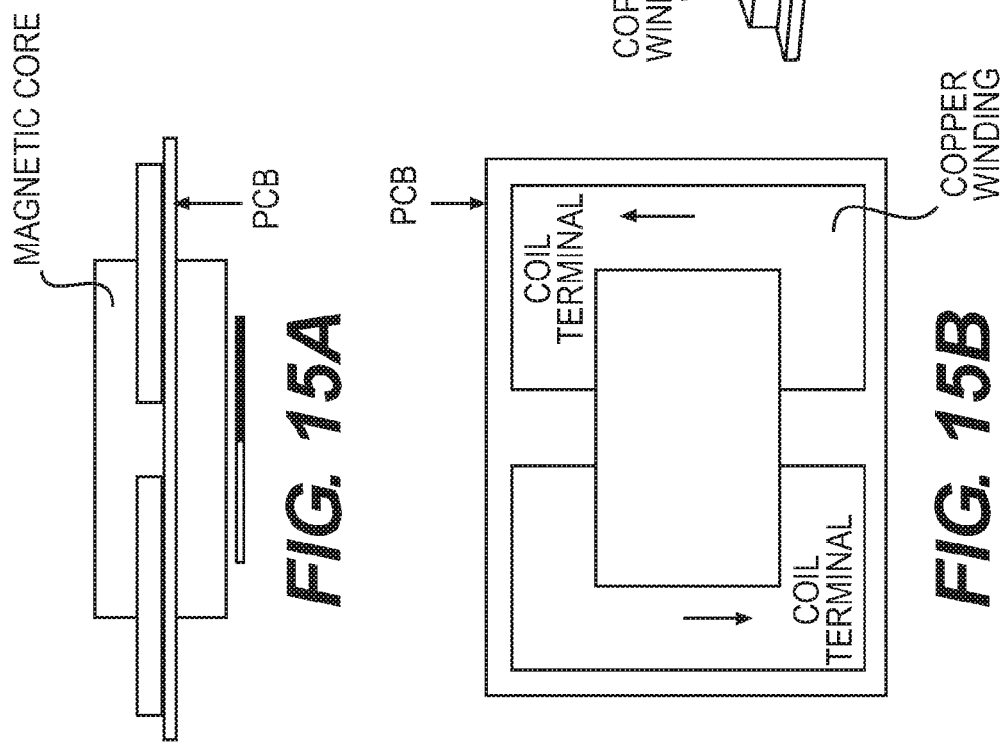

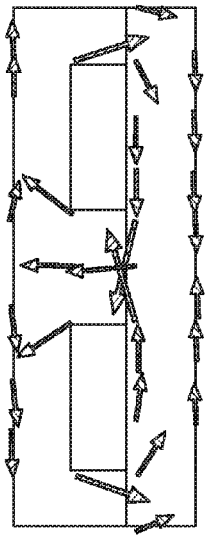
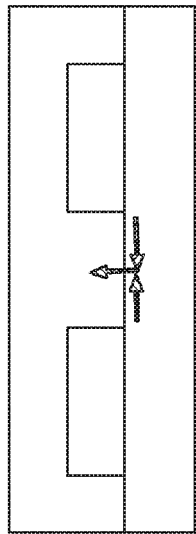
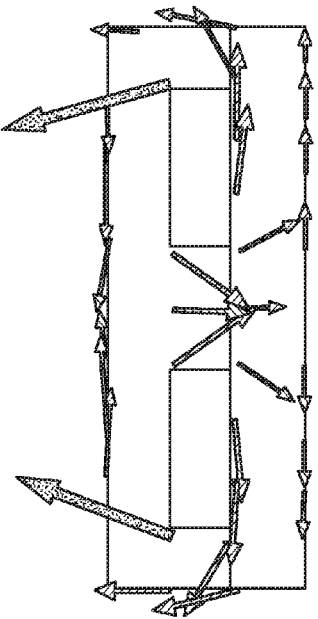
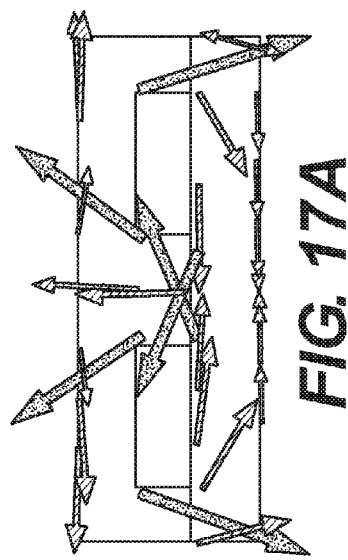
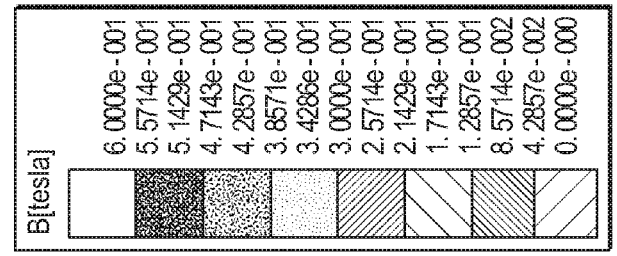

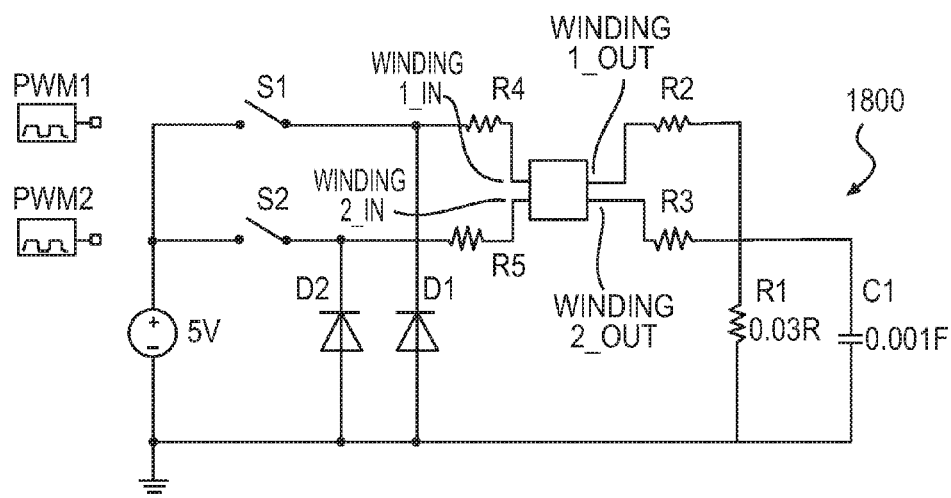
FIG. 18
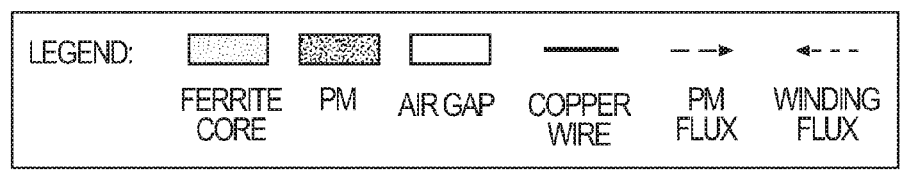
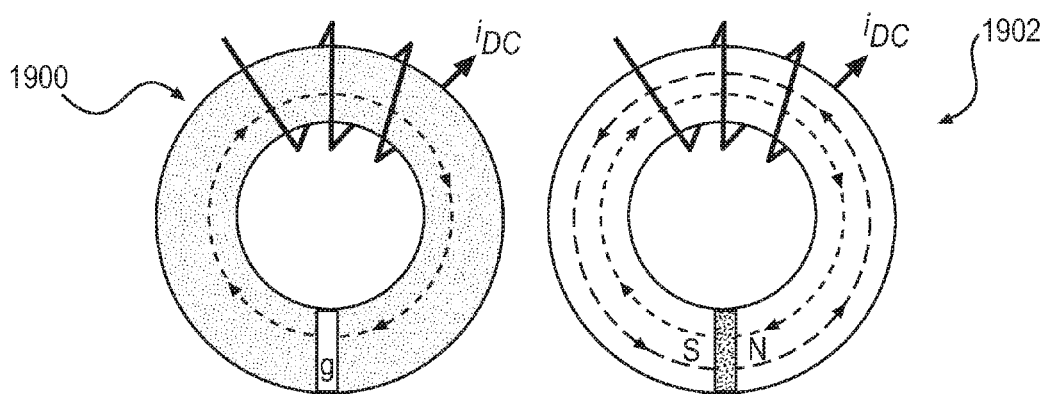
FIG. 19A  FIG. 19B

MULTI-STAGE PERMANENT MAGNET STRUCTURE AND INTEGRATED POWER INDUCTORS

CROSS-REFERENCE TO RELATED APPLICATION

The present application claims priority to U.S. Provisional Patent Application No. 61/827,851, filed May 28, 2013, entitled "PERMANENT MAGNET INTEGRATED POWER INDUCTORS FOR DC-DC SWITCHING POWER CONVERTERS," which is incorporated herein by reference in its entirety.

BACKGROUND

The performance of power devices such as power inductors and power FETs (Field Effect Transistors) affects the performance of switching power converter applications. The power inductor is one of the largest and most lossy components in a switching power converter, and it is accountable for much of the weight and the size of switching power converters. Several figures of merit are considered for power inductors including the inductance density, the current/power density, the DC resistance, the AC characteristics and the saturation current. In order to obtain higher inductance density, in other words, achieving the required inductance in as small area as possible, technologies like planner inductor, integrated inductors, micro-fabricated inductor and on chip inductor have emerged over the years. Saturation current is related to the core structure as well as the magnetic core material. For a given core structure and design, employing a magnetic material with higher saturation flux density helps to obtain a higher saturation current.

The power inductor, as a form of multiple winding coupled magnetic structures, has been used in many applications, such as is in multi-phase power converters. One of the main advantages of the coupled power inductor used in DC-DC power converters is the ability to obtain smaller equivalent transient inductance (advantageous for lower output voltage dynamic deviation under transients) with a larger equivalent steady-state inductance (advantageous for smaller steady-state output voltage ripple and higher power efficiency).

In a two-phase inductor, the two inductor windings can be directly or inversely coupled. Inversely coupled power inductor was employed in the multi-phase switching power converters to improve both the steady-state and transient performances. Permanent magnet power inductors (PMPI) utilize a permanent magnet (PM) to partially offset the flux in the magnetic core due to the DC component of the winding current, so that a higher saturation current could be obtained by the same core structure power inductor.

SUMMARY

In accordance with some implementations described herein, there is presented theory, apparatuses and methods directed to implementations of a permanent magnet couple power inductor. Various circuit models, design considerations and simulation results are described. Also presented is an on-chip implementation and fabrication techniques.

In accordance with an aspect, there is disclosed a permanent magnet on-chip power converter for DC-DC switching power converters that may include a top ferrite layer (or magnetic core), a spiral winding layer, a permanent magnet layer, a bottom ferrite layer, and a substrate layer. The permanent magnet layer may comprise a multi-stage structure wherein each stage has a decreasing area as compared to an immediate lower stage.

In accordance with other aspects, there is disclosed a method of manufacturing a Permanent On-Chip Power Inductor (PMOI). The method may include depositing of bottom ferrite layer on top of Si wafer having a SiO2 layer; sputtering a first SiO2 insulation layer on the bottom ferrite layer; depositing a multi-stage permanent magnet on the SiO2 insulation layer; sputtering of a seed layer for a winding layer; coating and pattering a photoresist mold for a spiral winding in the winding layer; filing an isolation material in between windings of the spiral winding; sputtering a second SiO2 insulation layer on the winding layer; and depositing a top ferrite layer.

In accordance with yet other aspects, there is disclosed a Permanent Magnet Couple Power Inductor (PMCI) that may include a first winding wound around a first leg, a second winding wound around a second leg, and a permanent magnet disposed within a gap central of a central leg. A first flux path associated with the first winding and a second flux path associated with the second winding interact with each other and are at least partially canceled by the permanent magnet.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative implementations, is better understood when read in conjunction with the appended drawings. For the purpose of illustrating the implementations, there are shown in the drawings example constructions; however, the implementations are not limited to the specific methods and instrumentalities disclosed. In the drawings:

FIGS. 1A and 1B show a spiral conventional on-chip power inductor (COPI) structure;

FIGS. 2A-2D illustrate examples permanent magnet (PM) structures;

FIGS. 4A-4C illustrate an example spiral Permanent On-Chip Power Inductor (PMOI);

FIGS. 5A-5B show ANSYS®/Maxwell® 3-D physical model of the example PMOI;

FIGS. 7A-7E show the B field of PMOI when the DC input current increases from zero to 8 A;

FIGS. 15A-15D show a ANSYS®/Maxwell® 3-D physical model of an example PMCI;

FIGS. 17A-17E illustrate the flux density (B) vector changes when the DC input current increases from zero to 25 A;

FIG. 18 illustrates a co-simulation model of an example two-phase buck power converter with the PMCI;

FIGS. 19A-19B illustrate front views of a toroid power inductor (TPI) and a permanent magnet toroid power inductor (PMTPI);

DETAILED DESCRIPTION

Figure 3A:
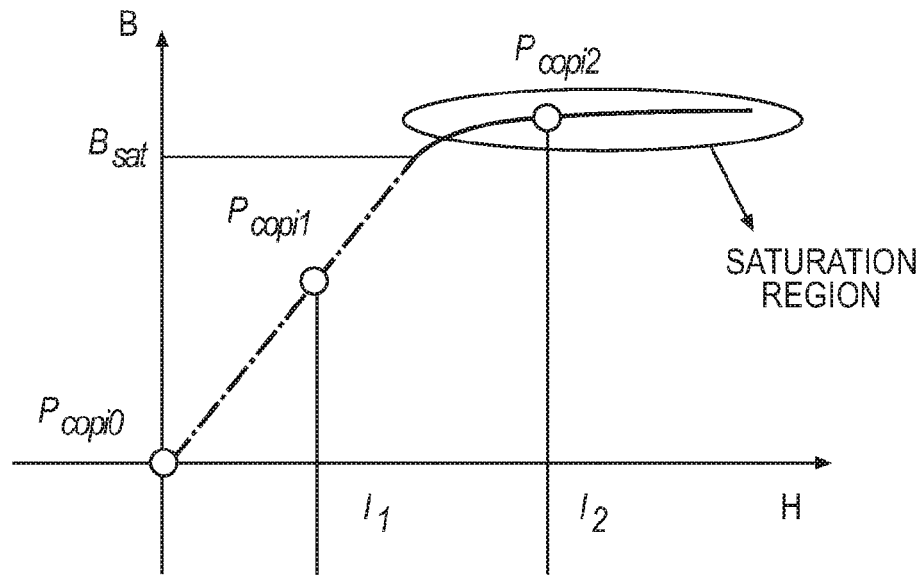
FIGS. 3A-3B illustrate operation points under different input currents 0, $I_1$, and $I_2$ ($0<I_1<I_2$)

The present disclosure presents theory, apparatuses and methods directed to implementations of a permanent magnet on-chip power inductor. Various circuit models, design considerations and simulation results are described.

Introduction to Permanent On-Chip Power Inductor (PMOI)

PMOI Structure and Operation Principle

The saturation current of a conventional power inductor can be described as in equation (1), $$I_{sat} = \frac{N \cdot B_{sat} \cdot A_e}{L} \quad (1)$$

Where N is the winding turns, $B_{sat}$ is the saturation flux density of the inductor core material, $A_e$ is the effective cross section area of the flux path and L is inductance, which is given by equation (2).

$$L = N^2 \cdot \mu_e \cdot \mu_0 \cdot \frac{A_e}{l_e} \quad (2)$$

$\mu_0 = 4 \cdot \pi \cdot 10^{-7}$ H/m is the vacuum permeability, $\mu_e$ is the effective permeability of the flux path and $l_s$ is the effective length of the flux path.

Due to the cancellation effect of the PM magnetic flux, the saturation current of the PMOI can be described as equation (3), $$I_{sat\text{-}PMOI} = I_{sat} + I_a \quad (3)$$

Where, $I_c$ denotes the PM cancellation current, which is the current value in the winding that results in zero net flux in the PMOI core.

FIG. 1A shows a spiral conventional on-chip power inductor (COPI) structure 100. There are three layers on top of the Si wafer for this inductor: a spiral copper winding, the top and bottom inductor core layers. FIG. 1B shows the PMOI structure diagram 102, where there is one additional permanent magnet layer 104 in between the bottom and core layer and spiral winding compared with the structure in FIG. 1 (a).

In order to obtain higher saturation current for the PMOI design, the PM in the PMOI (part of the invention) structure has to cancel as much winding flux as possible. Therefore, PM structure should carefully be designed for different shapes of windings in order to cancel more winding flux and get higher cancellation current. PM structure for spiral winding is investigated below.

An example spiral winding 200 is shown in FIG. 2A and its B field (when the DC input current is 6 A) is shown in FIG. 2A. It can be observed that B field of the winding is not uniformly distributed. Thus, in order to cancel more winding flux, similar B field distribution for PM is required.

There are several candidate structures for PM layer (part of the invention). Three of them are shown in FIGS. 2B-2D. The simplest structure is rectangular thin film PM 202, as shown in FIG. 2B (conventional PM), whose B field distribution is shown in FIG. 2B. In this case, too much flux is concentrated on the edges of the PM film, which if used in the power inductor, it will cause it to saturate. Meanwhile, there is almost no flux on top and bottom of the central part of rectangular PM. Thus, this configuration may not satisfy the design objective in terms of flux cancellation.

FIG. 2C shows a cone PM film 204, and its B field distribution is shown in FIG. 2C. FIG. 2D shows a multi-stage PM structure 208 and the associated B field distribution is shown in FIG. 2D. The PM structure 208 has a pyramid-like layered configuration. These two PM structures 208 have the similar B field distribution compared with spiral winding B field and therefore, the configuration could be used in the PMOI. However, the thin film cone structure is more difficult to fabricate compared to multi-stage PM. Thus, the spiral PMOI uses multi-stage PM as shown in FIG. 2C.

In addition to use in a power inductor, the multi-state PM may be used in other applications to obtain desirable characteristics, such as motors and generators in order to optimize field distribution.

Figure 3B:
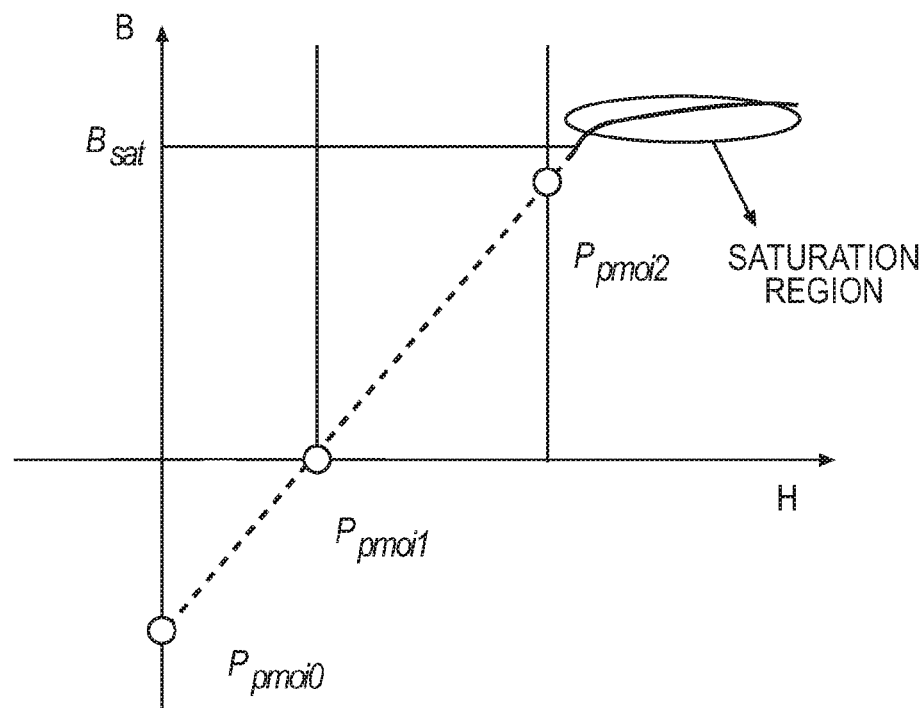
Figure 6A:
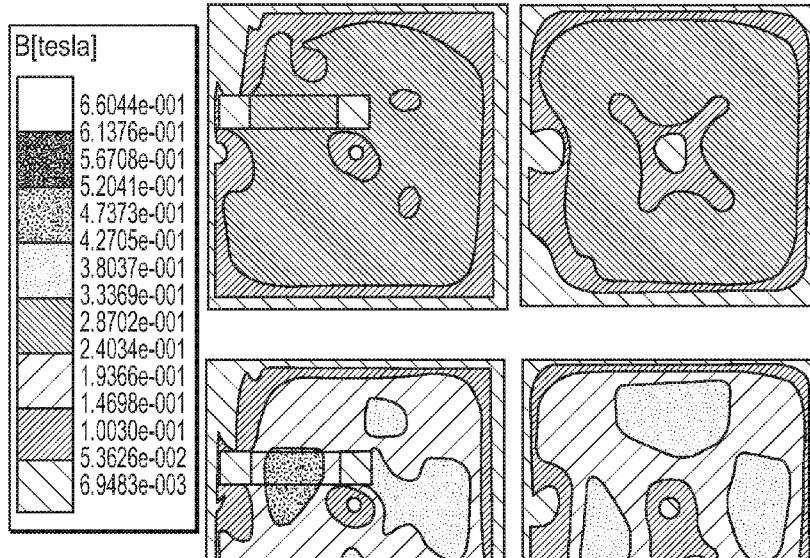
FIGS. 6A-6D show the B field of the spiral conventional on-chip power inductor (COPI)
Figure 6B:
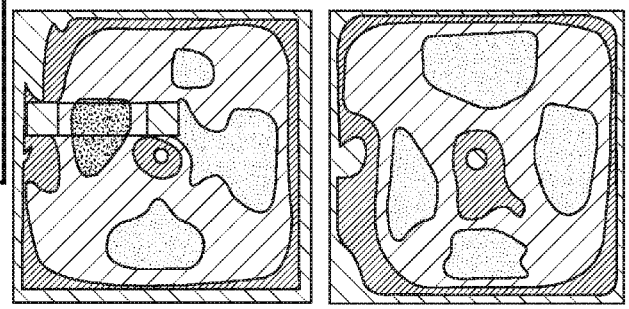
Figure 6C:
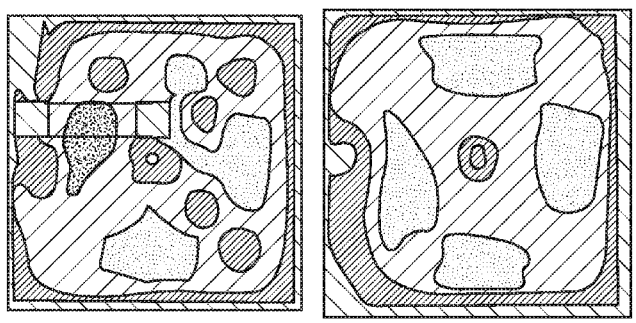
Figure 6D:
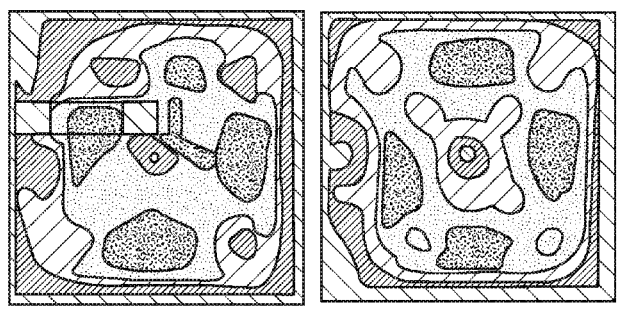

Operation Region Comparison of the Conventional On-chip Power Inductor (COPI) and the PMOI The PMOI and the COPI operation regions on the BH curve of magnetic core are compared in this subsection. In FIGS. 3A-3B, $P_{copi}$ and $P_{pmoi}$ denote the operation points of COPI and the PMOI, respectively. The operation points under different input currents 0, $I_1$, and $I_2$ ($0<I_1<I_2$) are shown in FIGS. 3A and 3B. When the input current is 0, $P_{copi0}$ is located at origin (both B and H are zero) while $P_{pmoi0}$ has a negative B value. When the input current is $I_1$, the B of PMOI is zero while $P_{copi1}$ is located in the linear region of the curve. When the input current is $I_2$, $P_{pmoi2}$ is still located in the linear region but $P_{copi2}$ is already in the saturation region. The operation region of COPI is represented by dash-dotted line in FIG. 3A, and the operation region of PMOI is represented by dashed line in FIG. 3B. It can be observed that PMOI has a larger operation region compared with the COPI. It is mainly because the PM opposing flux has a cancellation effect with the windings flux.

ANSYS®/Maxwell® 3-D Modeling and Simulation of PMOI

The PMOI design as shown in FIG. 1B is also compared with the air core spiral power inductor (API) and COPI as was shown in FIG. 1A.

Physical Model

An example spiral PMOI design diagram 200 is shown in FIGS. 4A-4C and its design specifications are listed in Table I. A better power inductor design requires higher inductance density, higher frequency, higher saturation current and lower eddy current loss and magnetic loss. Thus, inductor core material requires higher permeability ($\mu$), saturation flux density (Bsat) and higher resistivity ($\rho$). The winding of the conductor placed with the permanent magnet may be either copper or carbon nanotube (CNT). It is noted that the winding may be made of other materials. NiCuZn ferrite is used as the top and bottom inductor core layer. NdFeBN45SH is used as the multi-stage permanent magnet in this example design due to its high residual flux density (Br), coercivity (Hc) and intrinsic coercivity (Hci), but other types can also be used. The permanent magnet material can be part of the CNT, such as coating the CNT with permanent magnet material or mixing the permanent magnet and the CNT material. In some implementations, 10 stages may be provided in this PM structure, where each stage is 0.75 μm thick. In some implementations, the magnetic core used has non-uniform saturation levels and permeabilities (e.g., graded with several core layers of different types, thicknesses, widths, lengths, and areas) in order to match the flux distribution density of the permanent magnet.

TABLE I

PARAMETER VALUES

| Name | dimension | Material |
|---|---|---|
| Substrate | 525 μm thick | Si |
| Spiral winding | 3 turns<br>5.2 mm × 5.2 mm<br>100 μm thick<br>Wire width: 0.7 mm<br>Winding gap: 50 μm | Cu, Carbon Nonotube (CNT) |
| Bottom core layer | 5.2 mm × 5.2 mm<br>10 μm thick | NiCuZn ferrite<br>Bsat = 0.46 T<br>μ = 120<br>ρ = $10^8$ Ωm |
| Top core layer | 5.2 mm × 5.2 mm<br>11 μm thick | |
| PM layer | Base: 5 mm × 5 mm<br>Top: 1 mm × 1 mm<br>0.75 μm × 10 thick | NdFeBN45SH<br>Br = 1.32 T<br>Hc = 1003 kA/m<br>Hci = 1590 kA/m |

FIGS. 17A-17E show ANSYS®/Maxwell® 3-D physical model of the designed PMOI according to the design specifications in Table I. For comparison purposes, ANSYS®/Maxwell® 3-D physical models of an API and COPI without PM but having the same design specifications with PMOI are also developed. Comparison is shown in Table II. The dimensions specified in Tables I and II are approximate values.

TABLE II

ON-CHIP POWER INDUCTOR COMPARISON

| | API | COPI | PMOI |
|---|---|---|---|
| Inductor dimensions (without substrate) | 5.2 mm ×<br>5.2 mm ×<br>100 μm | 5.2 mm ×<br>5.2 mm ×<br>130 μm | 5.2 mm ×<br>5.2 mm ×<br>130 μm |
| Inductance (nH) | 29.2 | 50.9 | 48.4 |
| Inductance density (nH/mm³) | 10.7 | 14.5 | 13.8 |
| Saturation current (A) | — | 4 | 7 |

Simulation Results

The inductance of API and CPI measured from ANSYS®/Maxwell® are 29.2 nH and 50.9 nH, respectively. FIGS. 5A-5B show B field and vector of the API when the input DC current is 8 A. It can be observed that the maximum B is 0.019 T, which is very low because there is no inductor core. The saturation current of the API is very high but the inductance is low. FIGS. 6A-6D show the B field of the COPI under different input DC current values. It can be observed from FIGS. 6A-6D that both the top and bottom core layer is about to saturate when the DC input current is 4 A.

B Field of the PMOI

The inductance of PMOI measured from ANSYS®/Maxwell® is 48.4 nH, which is close to the inductance value of the CPI (50.9 nH). FIGS. 7A-7E show the B field of PMOI when the DC input current increases from zero to 8 A. When the input current is 0, B field is only generated by PM, as shown in FIG. 7A. The B value in FIG. 7A is less than the Bsat (0.46 T) of both top and bottom ferrite core, which means the inductor is not saturated by PM itself. From FIGS. 7A-7E, it can be observed that when the input DC current increases from 0 to 8 A, B value first decreases and then increases. When the input current is 3 A, the average B value gets the lowest value and is approximately 0, as shown in FIG. 7B. Thus the cancellation current of this PMOI design is 3 A. From equation (3), it can be obtained that the saturation current of the designed PMOI is about 7 A, which is consistent with the observation in FIG. 7D. That is to say, saturation current of the designed PMOI is 7 A. Thus, the multi-stage PM layer helps to increase the saturation current from 4 A to 7 A in this PMOI design (theoretically the saturation current can be doubled for the same size and inductance value).

Fabrication Process of the PMOI

Figure 8:
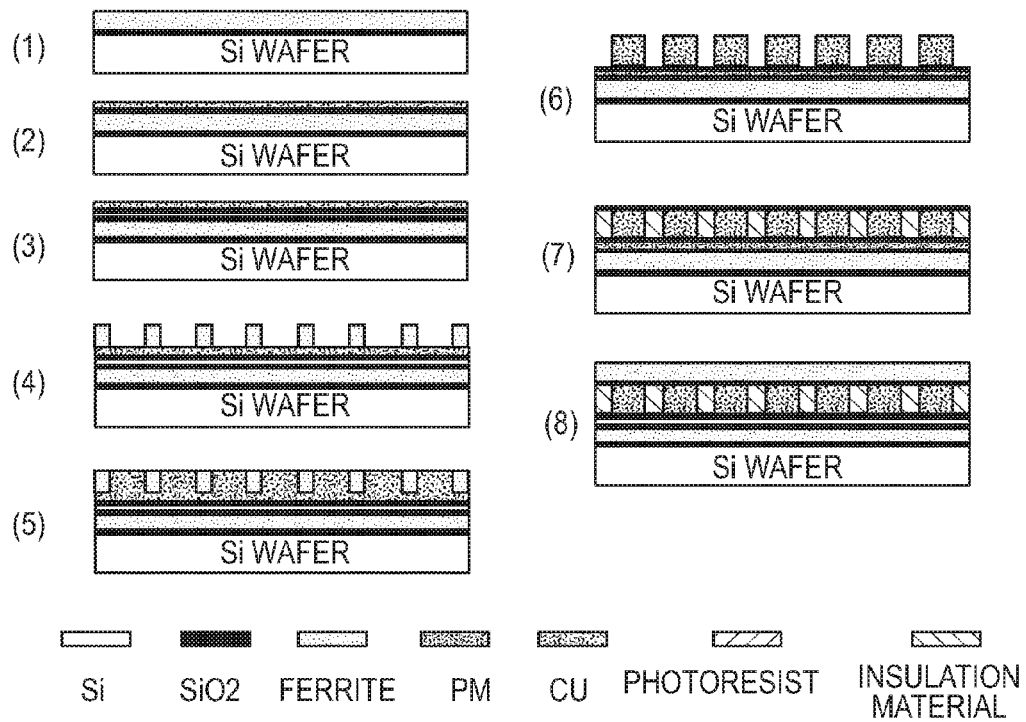
FIG. 8 shows an example process of the PMOI fabrication.

FIG. 8 shows an example process of the PMOI fabrication. In FIG. 8, the fabrication process for PMOI is shown as a series of steps, including: (1) Depositing of bottom ferrite layer on top of Si wafer with SiO2 layer; (2) Sputtering SiO2 insulation layer, then deposit multi-stage permanent magnet on top; (3) Sputtering of Cu seed layer for winding cupper; (4) coat and pattern photoresist mold for winding; (5) Electroplate Cu winding; (6) etch away photoresist mold and Cu seed layer; (7) fill isolation material in between the Cu windings, then sputtering SiO2 layer on top for insulation, (8) Top Ferrite deposition. For example, a 525 μm-thick p-type (100) silicon wafers are used. The wafer has a silicon dioxide layer on top.

Figure 9:
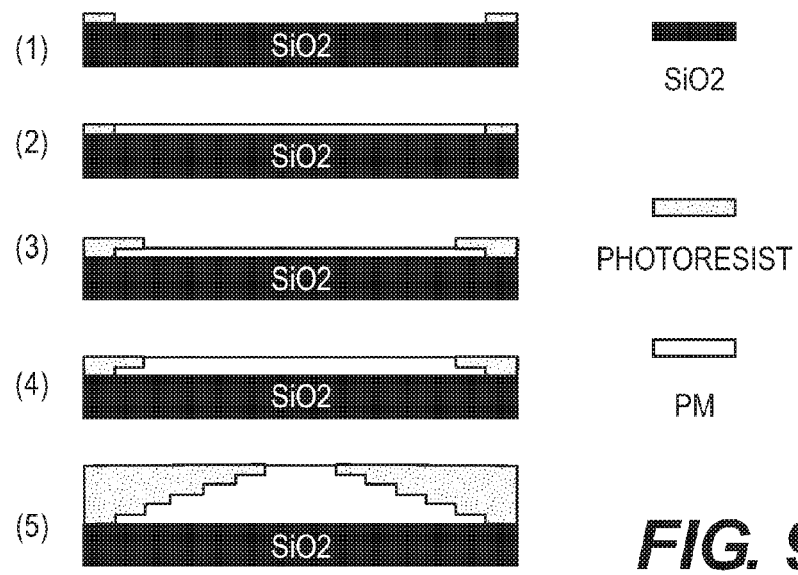
FIG. 9 shows the process of FIG. 20 in more detail.

The fabrication process starts with depositing of 10 μm bottom ferrite layer as show in FIG. 8 (1), then $SiO_2$ layer is sputtered for insulation. Next, multi-stage permanent magnet is deposited in step (2), detailed PM deposition process is shown in FIG. 9. After sputtering another $SiO_2$ insulation layer, a Cu seed layer for electroplating winding cupper is sputtered in step (3). Then followed by step (4): coating and patterning photoresist as a mold for spiral cupper winding, and electroplate winding cupper in step (5). Next, etch away the photoresist mold and Cu seed layer, then filled with insulation material, as shown in step (6) and (7). Finally, in step (8), 11 μm top ferrite layer is deposited.

More detailed process of multi-stage permanent magnet deposition is shown in FIG. 9, which shows a deposition process of multi-stage PM, including: (1) Coating and patterning photoresist mold for the base stage PM; (2) sputtering of base stage PM; (3) Photoresist mold for the second stage; (4) sputtering of second stage PM; (5) repeat (3) and (4) for Multi-stage PM. The process starts with coating and patterning photoresist as a mold and followed by sputtering the base stage PM, as shown in FIG. 9 (1)-(2). Then repeat the same process for sputtering the second stage PM in step (3) and (4). Repeating step (3) and (4) for multi-stage PM.

Thus, apparatuses and methods directed to implementations of a permanent magnet couple power inductor are described. Various circuit models, design considerations and simulation results are presented. Also, the above describes an on-chip implementation and fabrication techniques.

Introduction to a Permanent Magnet Coupled Power Inductor for Multi-phase DC-DC Switching Power Converters To obtain larger saturation current and higher inductance density for coupled power inductors, the present disclosure describes a permanent magnet coupled power inductor (PMCI) for multiphase power inductor by employing the operation principle of PMPI in conventional coupled power inductors. PMCI enables the reduction of the coupled power inductor size for multi-phase power converters and therefore, contribute to the higher power density system integration.

Permanent Magnet Coupled Power Inductor Structure and Operation Principle

Figure 10:
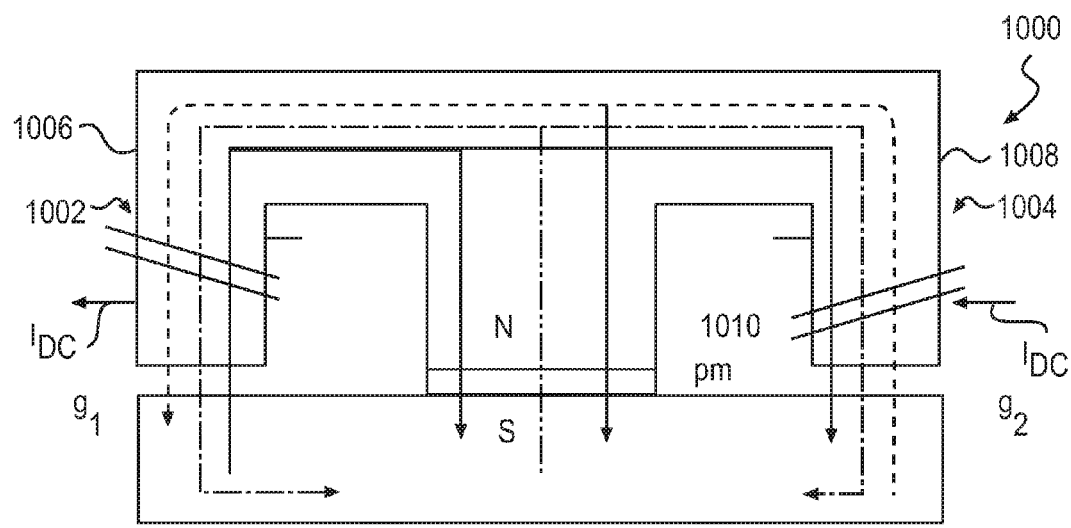
FIG. 10 illustrates a front view of a permanent magnet coupled power inductor (PMCI) with an EI core structure.

FIG. 10 illustrates the front view of a PMCI 1000 with an EI core structure. In this PMCI structure, two windings 1002, 1004 are wound around the two side legs 1006, 1008 and a relatively small piece of permanent magnet (PM) 1010 is placed in the central leg gap. The DC input current direction and the PM polarity are shown in FIG. 10. The flux path and direction generated by the left winding is represented by the solid arrowed line and the flux path generated by the right winding is represented by dashed arrowed line. The dash-dotted arrowed line denotes the flux path generated by the PM 1010. The fluxes generated by the two windings 1002, 1004 interact with each other in FIG. 10, denoting the inverse coupling effect between these two inductors. The PM flux loops and winding flux loops are in opposite directions. Thus, the flux generated by the windings could partially be canceled by the flux generated by the PM 1010. This flux cancellation effect helps in increasing the saturation current and inductance density of the power inductor, as will be described below.

Figure 11:
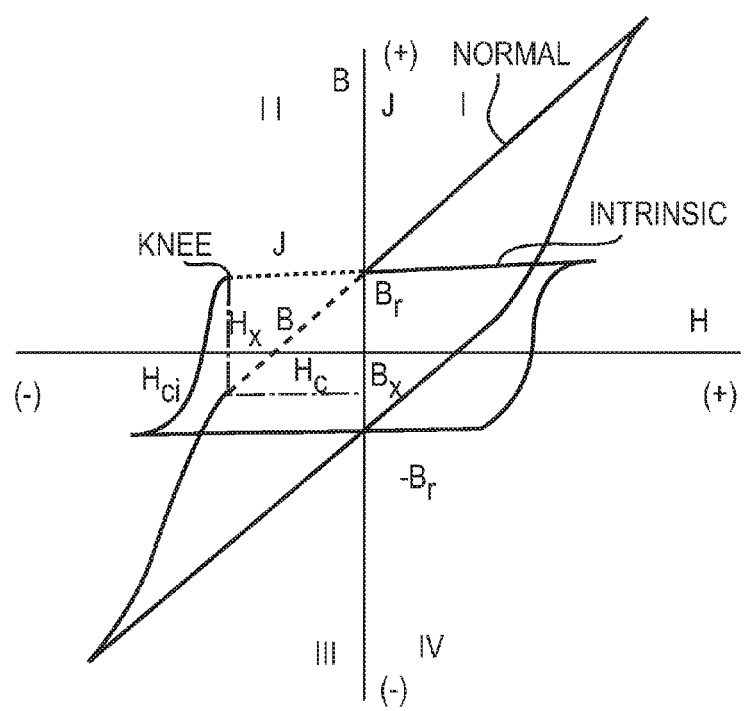
FIG. 11 illustrates a magnet hysteresis loop and B—H characteristic of a permanent magnet material.

Permanent magnets have a B—H characteristic with a wide hysteresis loop in order to prevent demagnetization of the material as shown in FIG. 11. Generally, the second quadrant of the hysteresis loop is used in analysis of permanent magnet behavior. The relationship between flux density (B) and field intensity (H) is known as the normal curve. The relationship between the intrinsic magnetization (J) and H is known as the intrinsic curve. The curves are related at every point by the equation B=J+H. In FIG. 11, the residual flux density Br is the maximum flux density of the PM in a closed loop configuration once the magnetizing field has been removed. He is the demagnetizing force which will reduce B to zero. Hci is demagnetizing force that reduces J to zero.

Demagnetization occurs when a sufficient magnetic field is applied across the magnet in the opposite direction of magnetization. For PMCI design, the point on the curve is the "knee" (as shown in FIG. 11), where the BH curve becomes nonlinear. Whenever the field is driven at or past the point $(H_x, B_x)$, then the material will start to be irreversibly demagnetized. Thus, the PMCI 1000 should avoid such demagnetization under the maximum or rated input current. In FIG. 11, the dashed part of the normal curve and dotted part of the intrinsic curve indicate the operation region of the PM in a PMCI.

Figure 12A:
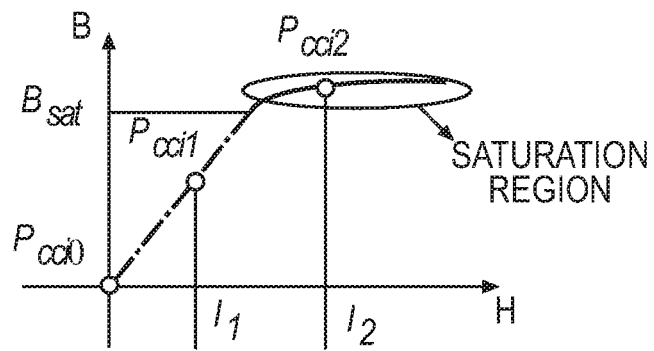
FIGS. 12A-12B illustrate an operation region comparison of (a) conventional coupled power inductor and (b) PMCI Magnetic Circuit Model of Permanent Magnet Coupled Power Inductor.
Figure 12B:
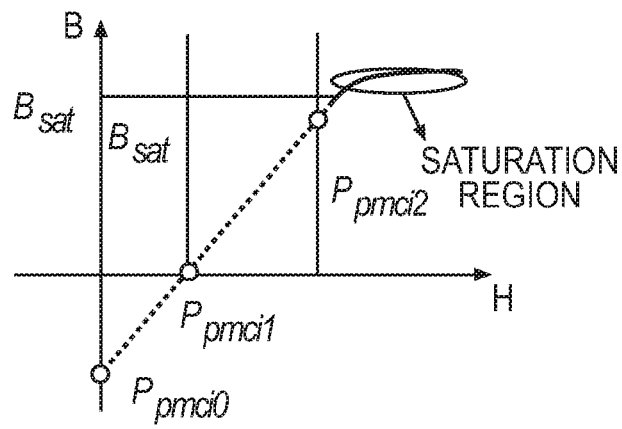

Operation Region Comparison of the Conventional Coupled Power Inductor and the PMCI With reference to FIGS. 12A-12B, there is illustrated an operation region comparison of (a) conventional coupled power inductor and (b) PMCI Magnetic Circuit Model of Permanent Magnet Coupled Power Inductor. The PMCI and the conventional coupled power inductor operation regions on the BH curve of magnetic core will now be compared. In FIGS. 12A-12B, $P_{cci}$ and $P_{pmci}$ denote the operation points of conventional coupled power inductor and the PMCI, respectively. The operation points under different input currents 0, $I_1$, and $I_2$ ($0<I_1<I_2$) are shown in FIGS. 12A-12B curve (a) and curve (b). When the input current is 0, $P_{cci0}$ is located at origin (both B and H are zero) while $P_{pmci0}$ has a negative B value. When the input current is II, the B of PMCI is zero while $P_{cci1}$ is located in the linear region of the curve. When the input current is $I_2$, $P_{pmci2}$ is still located in the linear region but $P_{cci2}$ is already in the saturation region. The operation region of conventional coupled power inductor is represented by dash-dotted line in FIG. 12A, and the operation region of PMCI is represented by dashed line in FIG. 12B. It can be observed that PMCI has a larger operation region compared with the conventional coupled power inductor. It is mainly because the PM opposing flux has a cancellation effect with the windings flux.

Figure 13:
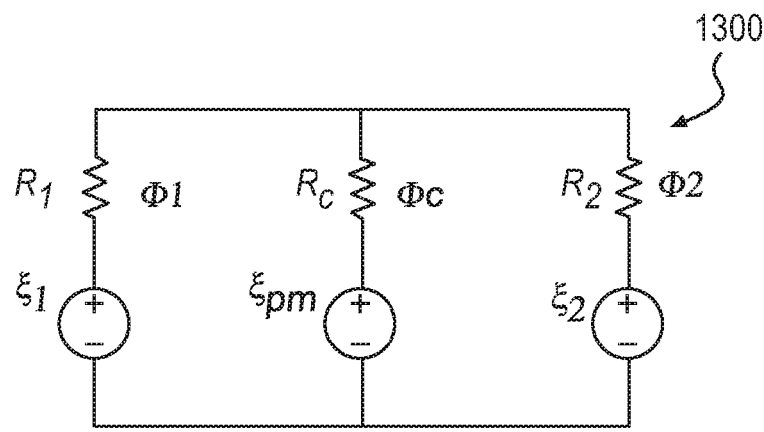
FIG. 13 illustrates a magnetic circuit model of a proposed EI core structure PMCI.

The magnetic circuit model 1300 of the proposed EI core structure PMCI is shown in FIG. 13. The magnetic reluctance of the three legs, namely $R_1$, $R_2$ and $R_c$, may be determined by the following equation:

$$R_i = \frac{l}{\mu \cdot A} (i = 1, 2, c) \tag{4}$$

Where l is the length of the magnetic flux path; μ is corresponding permeability of materials in the flux path; and A is corresponding cross-section area of the flux path. Compared to the conventional coupled power inductor with the same core structure, the side leg reluctances $R_1$ and $R_2$ of the PMCI remain unchanged. According to equation (4), the permanent magnet piece in the central leg gap in PMCI affects the central leg reluctance $R_c$. Usually, the permeability of PM material (e.g. the permeability of SmCo28 is 1.038*$\mu_0$) has a value that is very close to the air permeability ($\mu_0 = 4 \cdot \pi \cdot 10^{-7}$ H/m).

Based on Ampere's law, for each flux loop in FIG. 13, there exists $$\begin{cases} R_1 \cdot \phi_1 + R_c \cdot (\phi_1 + \phi_2) = N_1 \cdot i_1 - \xi_{pm} \\ R_2 \cdot \phi_2 + R_c \cdot (\phi_1 + \phi_2) = N_2 \cdot i_2 - \xi_{pm} \end{cases} \tag{5}$$

Where Ø is the magnetic flux, N is the winding number of turns and ξpmis the magnatomotive force of the permanent magnet piece.

The flux in each side leg can then be expressed by:

$$\begin{cases} \phi_1 = \frac{N_1 \cdot (R_2 + R_c)}{\Delta} \cdot i_1 - \frac{N_2 \cdot R_c}{\Delta} \cdot i_2 - \frac{R_2}{\Delta} \cdot \xi_{pm}, \\ \phi_2 = -\frac{N_1 \cdot R_c}{\Delta} \cdot i_1 - \frac{N_2 \cdot (R_1 + R_c)}{\Delta} \cdot i_2 - \frac{R_1}{\Delta} \cdot \xi_{pm}. \end{cases} \tag{6}$$

Where:

$$\Delta = R_1 \cdot R_2 + R_1 \cdot R_c + R_2 \cdot R_c \tag{7}$$

The differential of equation (6) is $$\begin{cases} v_1 = N_1 \cdot \frac{d\phi_1}{dt} = \frac{N_1^2 \cdot (R_2 + R_c)}{\Delta} \cdot \frac{di_1}{dt} - \frac{N_1 \cdot N_2 \cdot R_c}{\Delta} \cdot \frac{di_2}{dt}, \\ v_2 = N_2 \cdot \frac{d\phi_2}{dt} = \frac{N_1 \cdot N_2 \cdot R_c}{\Delta} \cdot \frac{di_1}{dt} + \frac{N_2^2 \cdot (R_1 + R_c)}{\Delta} \cdot \frac{di_2}{dt}. \end{cases} \tag{8}$$

The self-inductance, mutual inductance and coupling factor may be found. The relationship between the inductance and the magnetic reluctances are shown in (9).

$$\begin{cases} L_{s1} = \dfrac{N_1^2 \cdot (R_2 + R_c)}{\Delta}, \\ L_{s2} = \dfrac{N_2^2 \cdot (R_1 + R_c)}{\Delta}, \\ M = -\dfrac{N_1 \cdot N_2 \cdot R_c}{\Delta}. \end{cases} \quad (9)$$

Where $L_s$ is self-inductance and M is mutual inductance of the PMCI. Only symmetrical structure is further discussed for simplification. That is:

$$\begin{cases} N_1 = N_2 = N, \\ R_1 = R_2 = R, \\ L_{s1} = L_{s2} = L_s, \end{cases} \quad (10)$$

Equation (9) can then be simplified as $$\begin{cases} L_s = \dfrac{N^2 \cdot (R + R_c)}{R \cdot (R + 2 \cdot R_c)}, \\ M = -\dfrac{N^2 \cdot R_c}{R \cdot (R + 2 \cdot R_c)}, \\ \alpha = \dfrac{M}{L_s} = -\dfrac{R_c}{R + R_c}. \end{cases} \quad (11)$$

From equation (11), equation (12) is obtained, which gives the PMCI magnetic design equations. For a given self-inductance $L_s$ and a coupling factor $\alpha$, the magnetic reluctances of the outer and center legs are given by (12). The major reluctances of inductor cores are in the air gaps. Thus, the thickness of the air gaps may be.

$$\begin{cases} R = \dfrac{1}{1-\alpha} \cdot \dfrac{N^2}{L_s}, \\ R_c = \dfrac{-\alpha}{1-\alpha^2} \cdot \dfrac{N^2}{L_s}. \end{cases} \quad (12)$$

It can be observed even though equations (5) and (6) account for the PM effect (by $\xi_{pm}$ and $R_c$). This indicates that the utilization of PM does not have significant influence on the inductances, coupling factor and core structure of the coupled power inductor. This will be discussed further below.

ANSYS®/Maxwell® 3-D Modeling and Simulation of PMCI

The main objective of this section is to evaluate a PMCI design, as shown in FIG. 10, where the coupling factor is −⅓ and the self-inductance is about 480 nH. The measured inductance values obtained from ANSYS®/Maxwell physical simulation are shown in Table IV, as compared to a reference coupled power inductor (Original CI) design. The core size is 18 mm×10 mm×6.5 mm with the air gap length of 0.24 mm in each of the three legs.

Figure 14:
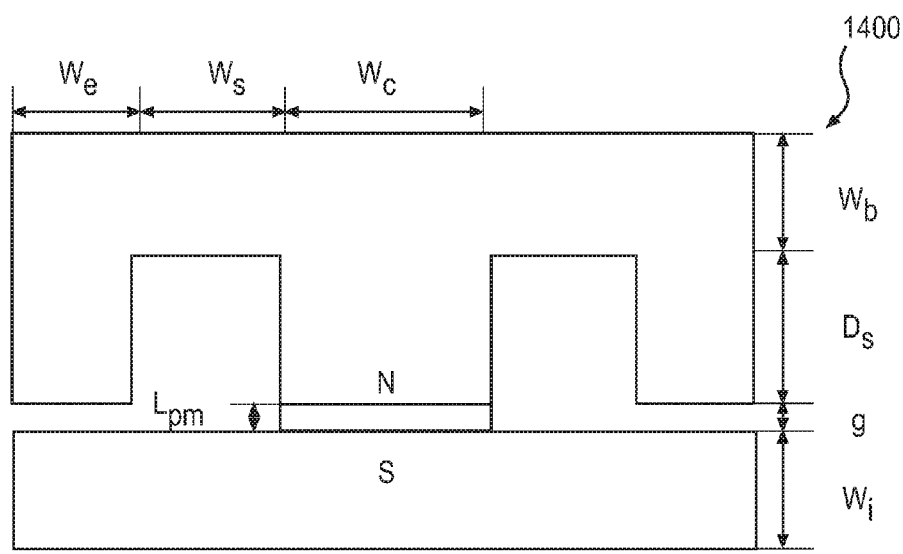
FIG. 14 illustrates a diagram of an example permanent magnet coupled power inductor.

With the utilization of a PM, a coupled power inductor with a smaller core is designed (New CI in Table IV) and modeled below. The permanent magnet piece is placed in the central leg gap. FIG. 14 illustrates a diagram of a permanent magnet coupled power inductor 500. The diagram of the PMCI is shown in FIG. 14 and the design specifications are given in Table III. In Table III, d is the depth of the core into the page, $A_w$ is the cross section area of each copper winding, g is the air gap length in each of the three legs, $T_{pm}$ and $T_{core}$ denotes material type of permanent magnet and inductor core respectively, $l_{pm}$ is the thickness of the PM, $A_{pm}$ is the cross section area of the PM, and N denotes the winding number of turns for each of the side legs.

FIGS. 15A-15A show ANSYS®/Maxwell® 3-D physical model of the designed PMCI according to the design specifications in Table III. In particular, FIGS. 15A-15D show ANSYS®/Maxwell® 3-D model of the designed PMCI: (a) front view (b) top view (c) E core and PM piece (d) 3-D view. The core material used is 3F3 (which starts to saturate when the flux density gets 0.35 T) and the permanent magnet material is NdFeB-N38SH. The core size of the designed PMCI is 14.5 mm×8 mm×5.2 mm with one turn in each side leg.

TABLE III

| Parameter Values | | |
|---|---|---|
| Parameter | Value | Units |
| d | 8 | mm |
| $W_e$ | 1.6 | mm |
| $W_s$ | 4 | mm |
| $W_c$ | 3.2 | mm |
| $W_b$ | 1.6 | mm |
| $D_s$ | 1.6 | mm |
| $W_l$ | 1.92 | mm |
| $A_w$ | 3.9 | mm$^2$ |
| g | 0.044 | mm |
| N | 1 | — |
| $T_{core}$ | 3F3 | — |
| $T_{pm}$ | NdFeB—N38SH | — |
| $l_{pm}$ | g/2 | mm |
| $A_{pm}$ | $W_c \times d$ | mm$^2$ |

In the inverse coupling case, without PM, the new designed coupled power inductor (New CI) approximately starts to saturate when the DC input current in each winding is 13 A. The inductance measured from ANSYS®/Maxwell® for the New CI is shown in Table IV.

Figure 16:
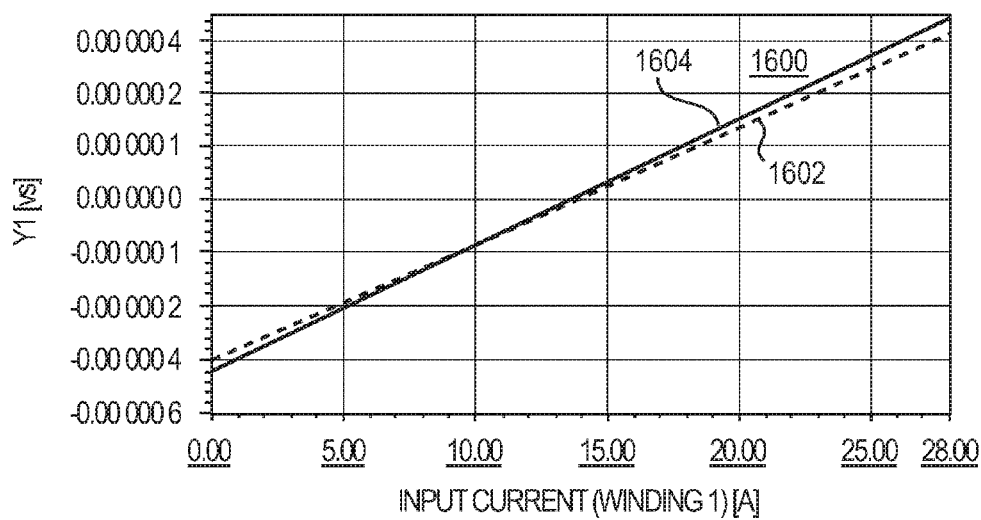
FIG. 16 illustrates a plot of the flux linkage.

The designed PMCI is obtained by placing a PM in the center leg of the NEW CI design. The inductance value measured in ANSYS®/Maxwell® is shown in Table IV. Flux linkages plots versus the DC input current are shown in FIG. 16 for the PMCI's winding1 and winding2. FIG. 16 illustrates a plot 1600 of the flux linkage of winding1 1602 and winding2 1604 of the designed PMCI when input current increase from zero to 28 A. It can be observed that the flux linkages of the two windings first decrease to zero when the input current is about 14 A, and then change the direction and increase.

TABLE IV

| Power Inductor Comparison | | | |
|---|---|---|---|
| | Original CI | New CI | PMCI |
| Core dimensions (mm$^3$) | 18 × 10 × 6.5 = 1170 | 14.5 × 8 × 5.2 = 603 | 14.5 × 8 × 5.2 = 603 |
| Self-inductance (nH) | 477 | 480 | 446 |
| Mutual inductance (nH) | −158 | −162 | −158 |
| Coupling factor | −0.33 | −0.34 | −0.35 |
| Inductance density (nH/mm$^3$) | 0.41 | 0.80 | 0.75 |

TABLE IV-continued

Power Inductor Comparison

|  | Original CI | New CI | PMCI |
|---|---|---|---|
| Current density under 25A input (A/mm$^3$) | 6.68 | 6.41 | 6.41 |
| Saturation current (A) per winding | 38 | 13 | 28 |

The changing tendency of B field is the same as the flux linkages. When the input current is zero, the average flux density is smaller than saturation flux density of the inductor core material, which means that the inductor core will not be saturated by the PM itself. It can be observed that the PMCI is about to saturate when the input current is 28 A. This means that the saturation current is higher by 15 A (more than doubled) compared with the same core inversely coupled power inductor without permanent magnet (the New CI), while keeping the same inductance values. Detailed comparison is shown in Table IV.

Table V, below, demonstrates an alternative PMCI design specification. Table VI compares the Original CPI, the New CPI and the PMCI.

TABLE V

The PMCI Design Specifications

| Parameter | Value | Units | Descriptions |
|---|---|---|---|
| $L_e$ | 18 | mm | Length of the core |
| $D_c$ | 5 | mm | Depth of the core |
| $H_e$ | 4 | mm | Height of the E core |
| $H_w$ | 2 | mm | Height of the core window |
| $W_c$ | 4 | mm | Width of the central leg |
| $W_s$ | 2 | mm | Width of the side leg |
| $L_g$ | 115 | μm | Length of the core gap |
| $L_{pm}$ | 47 | μm | Thickness of the PM |
| $D_{pm}$ | $D_c$ | mm | Depth of the PM |
| $W_{pm}$ | $W_c$ | mm | Width of the PM |
| $H_i$ | 2.4 | mm | Height of the I core |
| $L_{PCB}$ | 0.5 | mm | Thickness of the PCB |
| $TH_{cu}$ | 0.75 | mm | Thickness of the winding |
| $W_{cu}$ | 5 | mm | Width of the winding |
| N | 2 | — | Number of winding turns |
| $T_{core}$ | 3F3 | — | Material type of the core |
| $T_{pm}$ | NdFeB—N38SH | — | Material type of the PM |
| $T_{PCB}$ | FR-4 | — | Material type of the PCB |

TABLE VI

Comparison of The Original CPI, The New CPI and The PMCI

|  | Original CPI | New CPI | PMCI |
|---|---|---|---|
| Total inductor dimensions with windings (mm$^3$) | 28 × 20 × 6.46 = 3618 | 28 × 10 × 6.43 = 1800 | 28 × 10 × 6.43 = 1800 |
| Core dimensions (mm$^3$) | 18 × 10 × 6.46 = 1163 | 18 × 5 × 6.43 = 579 | 18 × 5 × 6.43 = 579 |
| Winding turns/phase | 2 | 2 | 2 |
| Length of core gaps | 245 μm | 115 μm | 115 μm |
| Permanent Magnet | — | — | 47 μm thick |
| $L_s$/Phase (nH) * | 478 | 444 | 481 |
| M (nH) * | −163 | −144 | −162 |
| α = M/$L_s$ * | −0.34 | −0.34 | −0.34 |
| Inductance density 2$L_s$/Core volume (nH/mm$^3$) * | 0.82 | 1.53 | 1.66 |
| $I_{sat}$ (A)/phase * | 30 | 15 | 30 |
| Current density/phase @ I = $I_{sat}$ (A/mm$^2$) * | 8 | 4 | 8 |

FIGS. 17A-17E illustrate the flux density (B) vector changes when the DC input current increases from zero to 25 A. The magnitude of the B vector changes agree with the B field changes and the direction changes agree with the direction changes of flux linkages in the two windings as plotted in FIG. 16.

One of the design constrains of the power inductor is the current density in the windings. The maximum current density value is less than 9.3 A/mm$^2$, which is acceptable for the PCB winding. Moreover, a PMCI design should be such that the PM is never demagnetized under the maximum input current. Demagnetization of NdFeB-N38SH permanent magnet material occurs when a field intensity (H), applied in the direction of demagnetization, is larger than 12.75×10$^5$ A/m at 20° C.

The analysis of ANSYS®/Maxwell® simulation results above including inductance value, flux density (B) field, current density (J) and field intensity (H) field verify the effectiveness of the designed PMCI. Comparisons between the conventional coupled power inductor and PMCI show the advantages of PMCI in increasing the saturation current, reducing the power inductor core size and increasing the inductance density.

Simplorer® and ANSYS®/Maxwell® Co-simulation Model and Results

Based on a two-phase DC-DC buck power converter with 50 A load current (25 A in each phase), 5V input voltage and 1.5V output voltage, the DC-DC buck converter operation waveforms with the PMCI are obtained by using Simplorer® and ANSYS®/Maxwell® co-simulation model. The co-simulation model 1800 of the two-phase buck power converter with the PMCI is shown in FIG. 18. The ANSYS®/Maxwell® physical simulation model of the PMCI is used in the circuit model of the power converter in Simplorer®. In this co-simulation model, the switching frequency is 500 kHz, output capacitor is 1 mF, load resistance is 0.03Ω (resulting in 50 A total load current) and the duty cycle is 0.3 (D=1.5V/5V=0.3).

Using the information of the waveforms obtained from the co-simulation model in equation (13), the steady-state inductance can be obtained and is equal to 458 nH. This inductance affects the steady-state performance (output voltage ripple and power efficiency) of the power converter. Usually, the larger it is, the better.

$$L_w = \frac{(V_{in} - V_{Trans} - V_{out})T_{on}}{\Delta i} = \frac{3.5 \times 6 \times 10^{-7}}{4.5891} = 458 \text{ nH} \quad (13)$$

For the two-phase DC-DC buck converter with coupled power inductor, the equivalent steady state inductance could also be calculated from equation (14).

$$L_{ss} = \frac{1-\alpha^2}{1+\frac{D \cdot \alpha}{1-D}} \cdot L_s = \frac{1-(-0.35)^2}{1+\frac{0.3*(-0.35)}{1-0.3}} \times 446 = 460 \text{ nH} \quad (14)$$

Where α is coupling factor, D is duty cycle and $L_{ss}$ is self-inductance.

From equation (14) and PMCI parameters in Table IV, the steady-state equivalent inductance can be calculated as 460 nH, which very closely agrees with the result obtained from the co-simulation waveforms (458 nH).

The transient inductance could be calculated from equation (15) and is found to be 290 nH.

$$L_{ss}=(1+\alpha)L_s=(1-0.35)\times 446=290 \text{ nH} \quad (15)$$

This equivalent transient inductance affects the dynamic performance (output voltage deviation/overshoot/undershoot during dynamic transients) of the power converter. Usually, the smaller it is, the better.

Thus, as described above, a 25 A per phase, 14.5 mm×8 mm×5.2 mm two-phase PMCI which has ~460 nH equivalent steady state inductance and ~290 nH equivalent transient inductance is presented. The design and simulation results based on a two-phase DC-DC buck power converter with 50 A load current, 5V input voltage and 1.5V output voltage show the effectiveness of designed PMCI. By using Simplorer® and ANSYS®/Maxwell® co-simulation model, the DC-DC buck converter operation waveforms with the PMCI may be obtained. The results show that the presented PMCI is able to increase the saturation current by about 115% for the same size and inductance value of the conventional coupled power inductor, or approximately double the inductance density while maintaining high saturation current compared with the conventional coupled power inductor.

Introduction to Permanent Magnet Toroid Power Inductor with Increased Saturation Current A toroid is a power inductor core structure which offers high magnetic efficiency due to the uniformity of its cross-sectional area. A gapped ferrite toroid core may be employed to increase the saturation current by reducing the effective permeability of the flux path. A permanent magnet toroid power inductor (PMTPI) that utilizes a permanent magnet (PM) is described to further increase the saturation current of the conventional gapped toroid power inductor (TPI).

Structure and Operation Principle of the PMTPI

A PMTPI utilizes a PM to partially offset the flux in the toroid magnetic core as a result of the winding current, such that a higher saturation current could be obtained. The front view of a TPI 1900 and a PMTPI 1902 diagrams are illustrated in FIGS. 19A and 19B, respectively. In the PMTPI structure, a winding is wound around the toroid ferrite core and a small piece of PM is placed in the gap. The DC input current direction and the PM polarity are shown in FIGS. 19A-19B. In this diagram, the flux path generated by winding is represented by the dotted arrowed (orange) line, while the flux path generated by the PM is denoted by the dashed arrowed (green) line. It can be observed from FIG. 19B that the two flux loops are in opposite directions. Thus, the winding flux could partially be canceled by the PM flux. This flux cancellation effect helps in increasing the saturation current of the PMTPI.

Inductance (L) and saturation current ($I_{sat}$) of TPI can be described by equations (16) and (17), respectively:

$$L = N^2 \cdot \mu_e \cdot \mu_0 \cdot \frac{A_e}{l_e} \quad (16)$$

$$I_{sat} = \frac{N \cdot B_{sat} \cdot A_e}{L} \quad (17)$$

Where N is the number of winding turns, $\mu_e$ is the effective permeability of the flux path, $\mu_0 = 4\pi \cdot 10^{-7}$ H/m is the vacuum permeability, $A_e$ is the effective cross section area of the toroid core, $l_e$ is the length of the flux path, and $B_{sat}$ is the saturation flux density of the core material. Equation (16) could also be used to calculate the inductance value of the PMTPI.

Due to the cancellation effect of the PM magnetic flux, the saturation current of the PMTPI can be described as equation (18).

$$I_{sat\_PMTPI} = I_{sat} + I_c \quad (18)$$

Where, $I_c$ denotes the current at which net flux density of the winding and the PM becomes zero in the PMTPI core. Accordingly, the higher the cancellation current, the larger PMTPI saturation current will be.

ANSYS®/Maxwell® 3-D Modeling and Simulation Results of the PMTPI

The PMTPI design is also compared with a conventional TPI design with the same structure, size and inductance value.

Physical Model

Figure 20:
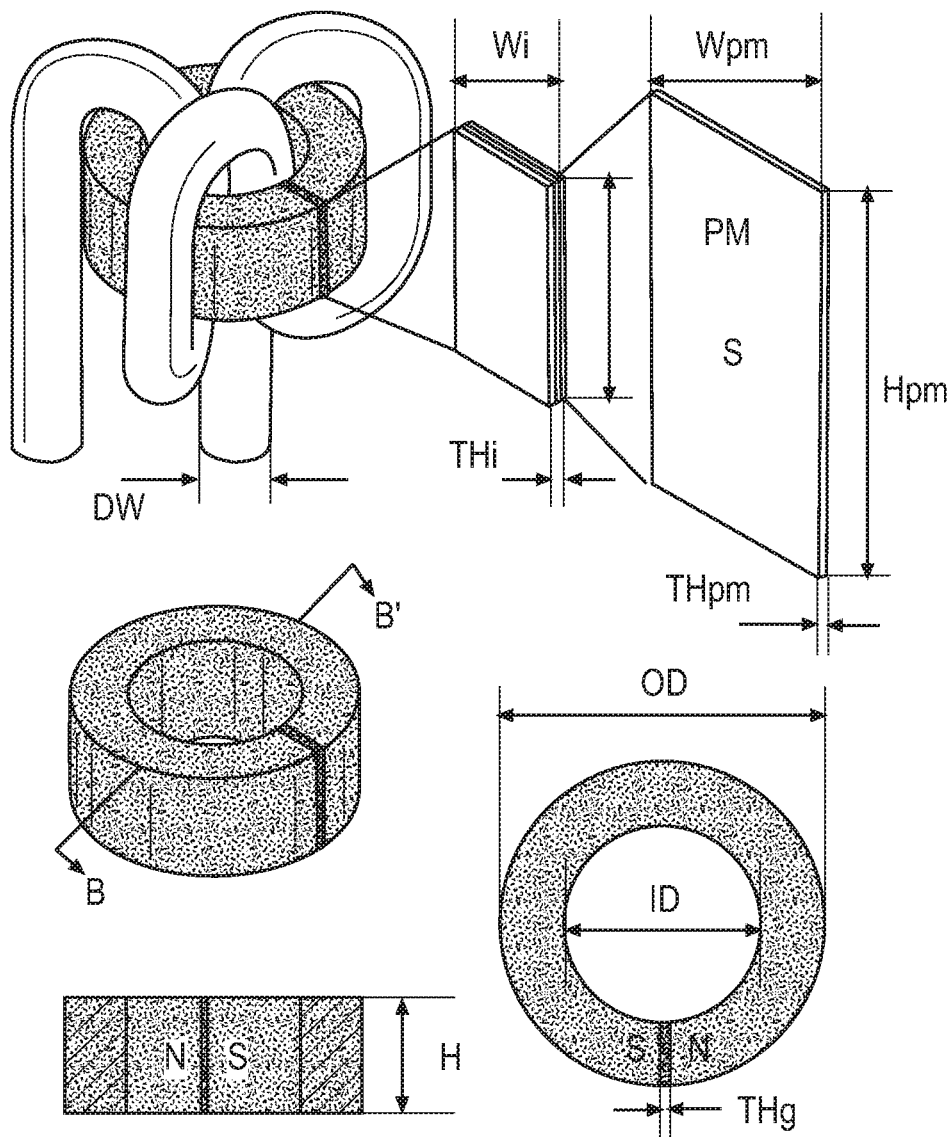
FIG. 20 illustrates a diagram of an example PMTPI design.

The diagram of the PMTPI design with specifications is shown in FIG. 20 and the corresponding parameter values are listed in Table V. The design specifications include material and dimensions of core, winding, insulator and PM.

TABLE V

THE PMTPI DESIGN SPECIFICATIONS

| Parameter | Values | Unit | Description |
|---|---|---|---|
| OD | 10 | mm | Outer diameter of core |
| ID | 6 | mm | Inner diameter of core |
| H | 4 | mm | Height of core |
| THg | 0.3 | mm | Length of gap |
| THpm | 0.08 | mm | Thickness of PM |
| Wpm | (OD-ID)/2 | mm | Width of PM |
| Hpm | 4 | mm | Height of PM |
| Hi | 4 | mm | Height of insulator |
| Wi | (OD-ID)/2 | mm | Width of insulator |
| THi | THg-THpm | mm | Thickness of insulator |
| N | 2.75 | — | Winding turns |
| Dw | 2.5 | mm | Diameter of copper wire |
| Tcore | 3C20 | — | Material type of core |
| Ti | FR-4 | — | Material type of insulator |
| Tpm | NdFeB—N45SH | — | Material type of PM |

Figure 21:
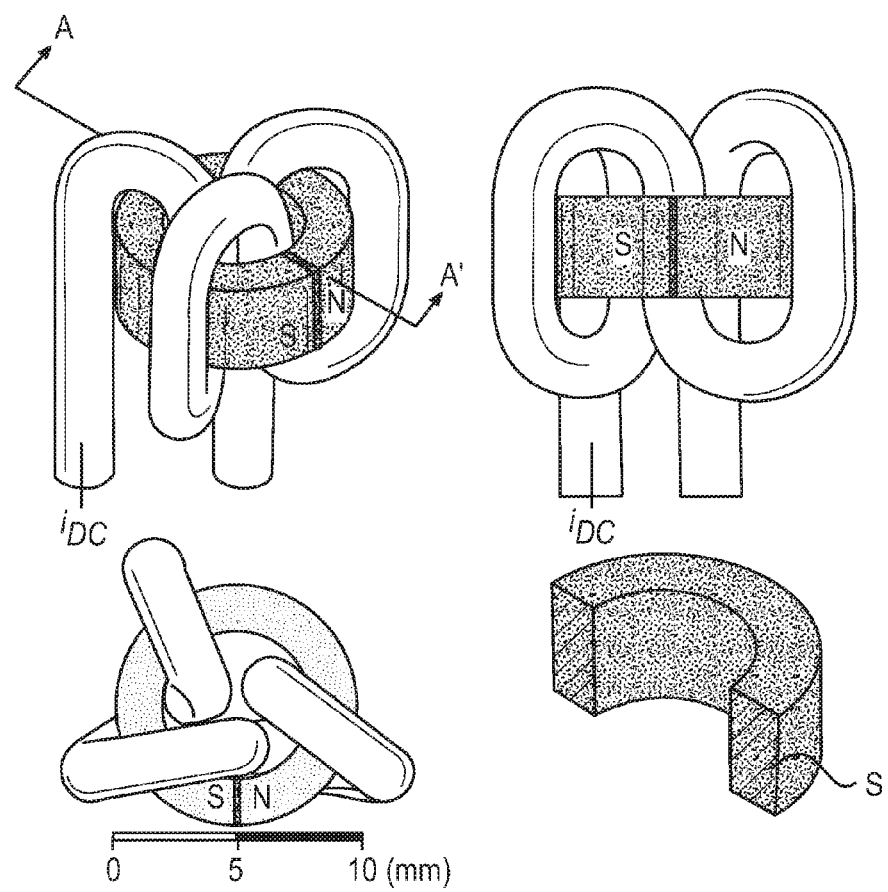
FIG. 21 shows ANSYS®/Maxwell® 3-D physical model of the example PMTPI.

FIG. 21 shows ANSYS®/Maxwell® 3-D physical model of the designed PMTPI according to the design specifications in FIG. 20 and Table V. In FIG. 21, (a) is a 3-D view, (b) is a front view, (c) is a top view and (d) is a cross sectional view of the toroid core along A-A' as in part (a) The PMTPI design uses the gapped ferrite toroid TN10/6/4 as the inductor core. The core material used is 3C20 ($B_{sat}$ is 0.47 T) and the PM material is NdFeB-N45SH (Residual flux density Br=1.32 T, coercivity Hc=1003 kA/m and intrinsic coercivity Hci=1590 kA/m).

For comparison purposes, an ANSYS®/Maxwell® 3-D physical model of a conventional TPI (without PM) but having the same design specifications as shown in Table V is also developed. Results comparison between TPI and PMTPI is shown in Table VI. More detailed descriptions for the ANSYS®/Maxwell® simulation results are given next.

TABLE VI

Comparison Between TPI and PMTPI Based on the ANSYS ®/Maxwell ® 3-D Simulation

| | TPI | PMTPI |
|---|---|---|
| Total inductor dimensions | 12.5 mm × 12.5 mm × 6.5 mm | 12.5 mm × 12.5 mm × 6.5 mm |
| Core dimensions OD/ID/H | 10 mm/6 mm/4 mm | 10 mm/6 mm/4 mm |
| Effective gap | Air or Insulator 0.3 mm | Insulator and PM 0.3 mm |
| Number of winding turns | 2.75 | 2.75 |
| Permanent Magnet (YES/NO) | NO | YES |

TABLE VI-continued

Comparison Between TPI and PMTPI Based on the
ANSYS ®/Maxwell ® 3-D Simulation

|  | TPI | PMTPI |
|---|---|---|
| Inductance (nH) | 592 | 592 |
| Saturation current (A) | 14 | 28 |

Simulation Results for the TPI

The inductance of the TPI measured from ANSYS®/Maxwell® is 592 nH. Results indicate that the inductor core starts to saturate when the DC input current is 14 A, i.e. $I_{sat\_TPI}=14$ A.

Field of the PMTPI

The inductance of PMTPI as measured from ANSYS®/Maxwell® is 592 nH. It can be observed that when the input current is 0, the average net B value is less than $B_{sat}$ of the inductor core material (0.47 T). This indicates that the magnetic core is not saturated by PM itself. It could also be observed that when the input DC current increases from 0 to 30 A, the net B value first decreases to zero at 14 A, then increases to $B_{sat}$ at 28 A. Thus the cancellation current of this PMTPI design is 14 A. When the DC input current is 14 A, the fluxes of winding and PM have the same values but in opposite directions, which makes the net flux inside of the PMTPI core equals to zero. It could be predicted from equation (5) that $I_{sat\_PMTPI}=14+14=28$ A. Observations indicate that the PMTPI starts to saturate at 28 A. Simulation results show that the saturation current in the PMTPI is twice of the saturation current in the TPI with the same size and inductance value.

It can be observed that the net B vector changes when the DC input current increases from zero to 28 A. The magnitude changes are consistent with B field changes, and that the vector direction becomes opposite when the DC input current increases from less than the cancellation current (14 A) to higher than the cancellation current.

Demagnetizing Field (H) of the PM

Demagnetization of NdFeB-N45SH PM material occurs when a reverse field (H) larger than $12.97 \times 10^5$ A/m (at 25° C.) is applied to the PM. PMTPI design has to ensure that the PM is never demagnetized under the maximum input current. It can be observed from that the maximum H value is $11.33 \times 10^5$ A/m. This indicates that the PM used in the PMTPI design will not be demagnetized for an input current is as high as 30 A.

The physical model simulation results of the permanent magnet toroid power inductor (PMTPI) showed that the saturation current can be doubled with the same size and inductance. The PMTPI achieves these results with its relatively simple power inductor structure and design.

The toroid core with permanent magnet can have one or more windings that could be coupled or not coupled.

It should be emphasized that the above-described implementations are merely possible examples of implementations set forth for a clear understanding of the principles of this disclosure. Many variations and modifications may be made to the above-described implementations without departing substantially from the spirit and principles of the disclosure. All such modifications and variations are intended to be included herein within the scope of this disclosure.

What is claimed is:

1. A permanent magnet on-chip power converter for DC-DC switching power converters, comprising:
   a top ferrite layer;
   a spiral winding layer having at least one winding turn that is disposed under the top ferrite layer and wound about a permanent magnet layer, the permanent magnet layer comprising a multi-stage structure wherein each stage has a decreasing area as compared to an immediate lower stage;
   a bottom ferrite layer that is disposed under the permanent magnet layer; and
   a substrate layer that is disposed under the bottom ferrite layer.

2. The permanent magnet on-chip power converter of claim 1, wherein the spiral winding layer comprises one of copper or carbon nanotube (CNT).

3. The permanent magnet on-chip power converter of claim 2, wherein the spiral winding layer includes at least three turns with a wire width of approximately 0.7 mm and a winding gap of approximately 50 μm, wherein the spiral winding layer is approximately 100 μm thick.

4. The permanent magnet on-chip power converter of claim 2, wherein the CNT is coated with a permanent magnet material or mixed with the permanent magnet to form a least a portion of the permanent magnet layer.

5. The permanent magnet on-chip power converter of claim 1, wherein each stage of the permanent magnet layer is formed having a generally square shape.

6. The permanent magnet on-chip power converter of claim 5, wherein each stage of the multi-stage permanent magnet layer is approximately 0.75 μm thick.

7. The permanent magnet on-chip power converter of claim 1, wherein the permanent magnet layer is generally pyramid-shaped.

8. The permanent magnet on-chip power converter of claim 7, wherein 10 stages are provided in the multi-stage permanent magnet layer.

9. The permanent magnet on-chip power converter of claim 1, wherein the top ferrite layer and bottom ferrite layer have non-uniform saturation levels and permeabilities in order to match a flux distribution density of the permanent magnet.

* * * * *